United States Patent [19]
Bradfield et al.

[11] Patent Number: 5,296,772
[45] Date of Patent: Mar. 22, 1994

[54] VENTILATED BRUSH HOLDER

[75] Inventors: Michael D. Bradfield, Anderson; David L. Wright, Pendleton; Thomas R. Sowash, Anderson, all of Ind.

[73] Assignee: General Motors Corporation, Detroit, Mich.

[21] Appl. No.: 43,081

[22] Filed: Apr. 5, 1993

[51] Int. Cl.⁵ .......................................... H02K 13/00
[52] U.S. Cl. ..................................... 310/242; 310/88; 310/239; 310/89
[58] Field of Search ...................... 310/43, 88, 89, 232, 310/239, 242, 245, 263

[56] References Cited

U.S. PATENT DOCUMENTS

| | | | |
|---|---|---|---|
| 4,406,963 | 9/1983 | Wolf et al. | 310/239 |
| 4,492,885 | 1/1985 | Kitamura et al. | 310/89 |
| 4,546,280 | 10/1985 | Pfluger | 310/68 D |
| 4,626,720 | 12/1986 | Fukasaku et al. | 310/88 |
| 4,659,950 | 4/1987 | Gotoh | 310/89 |
| 4,673,836 | 6/1987 | Akiyama et al. | 310/239 |
| 4,705,983 | 11/1987 | Franz et al. | 310/89 |
| 4,730,155 | 3/1988 | Dolderer et al. | 310/68 D |
| 4,845,396 | 7/1989 | Huber | 310/239 |
| 4,859,135 | 8/1989 | Akutsu et al. | 310/239 |
| 4,859,894 | 12/1989 | Akutsu et al. | 310/239 |
| 4,959,576 | 9/1990 | Horibe et al. | 310/239 |
| 5,055,728 | 10/1991 | Looper et al. | 310/239 |
| 5,185,544 | 2/1993 | Takada | 310/88 |
| 5,196,750 | 3/1993 | Strobl | 310/239 |

OTHER PUBLICATIONS

Publication—"Alternator Anti-Contamination Shield", Research Disclosure No. 33480, Feb., 1992.

Primary Examiner—Steven L. Stephan
Assistant Examiner—Thomas M. Dougherty
Attorney, Agent, or Firm—Creighton R. Meland

[57] ABSTRACT

A ventilated brush holder for an alternating current generator. The brush holder has a tubular shield portion, a brush holding portion and a bearing retainer portion. The shield portion encloses the slip rings of the rotor of the generator. The brush holding portion has bores that are open to the interior of the shield portion. Brushes are located in the bores that project into the shield portion and engage the slip rings. The bearing retaining portion is disposed between and engages an internal surface of an opening in the frame of the generator and an outer surface of the outer race of a ball bearing for the rotor shaft. The bearing retainer portion has a plurality of circumferentially spaced and axially extending slots that form air passages. A fan is driven by the rotor shaft and when it is rotated, air is caused to flow through the shield portion and then through the slots in the bearing retainer portion. This flow of air cools the brushes and the bearing and carries away brush dust. Moisture contained in the air tends to promote the creation of a brush dust film on the slip rings.

7 Claims, 2 Drawing Sheets

VENTILATED BRUSH HOLDER

This invention relates to brush holders for dynamoelectric machines and more particularly to a ventilated brush holder that allows air to pass through the brush holder.

Alternating current generators utilize brush holders that support carbon brushes that are urged into engagement with copper slip rings. As the brushes wear, brush dust is developed and a brush dust film is developed on the slip rings. The brush dust film is beneficial but the spent brush dust can be a problem. The spent brush dust can accumulate and cause the slip rings to short, or cause slip ring to shaft grounds. The spent brush dust can also accumulate near the rotor bearing and enter into the bearing grease past the bearing seal. Once this occurs, the bearing life suffers due to the abrasive and drying action of the brush dust.

It accordingly is an object of this invention to provide a ventilated brush holder where air that is impelled by a rotor fan of a dynamoelectric machine passes through the brush holder. This flow of air through the brush holder has several benefits. First of all, the spent brush dust becomes airborne and is carried by the flow of air out of the dynamoelectric machine. Second, the air that passes through the brush holder contains a certain amount of moisture which promotes the development of brush dust film on the slip rings which improves the brush wear rate of the brushes.

More specifically a brush holder made in accordance with this invention is a one-piece plastic part that has a tubular contaminant shield portion, a brush holding portion and a tubular bearing retaining portion. The bearing retainer portion has a plurality of circumferentially spaced and axially extending slots that form air passages or channels. The brush holder is installed in a dynamoelectric machine, such as an alternating current generator, with the tubular contaminant shield portion disposed about the slip rings of the rotor assembly of the machine. The bearing retainer portion supports the outer race of a ball bearing and the slots or channels are disposed about the outer race. The dynamoelectric machine has a fan that is driven by the rotor and this fan causes air to flow through the brush holder and out through openings formed in the frame of the machine. This flow of air is through the tubular shield portion and then through the channels formed in the bearing retainer portion. The air that passes through the tubular shield portion contacts portions of brushes that are supported by the brush holding portion and which extend into the shield portion. This air also contacts the slip rings. This air cools the brushes and slip rings and it carries brush dust away. The air passing through the channels contacts the outer race of the ball bearing and accordingly cools the bearing to reduce temperature.

IN THE DRAWINGS

Figure 1:
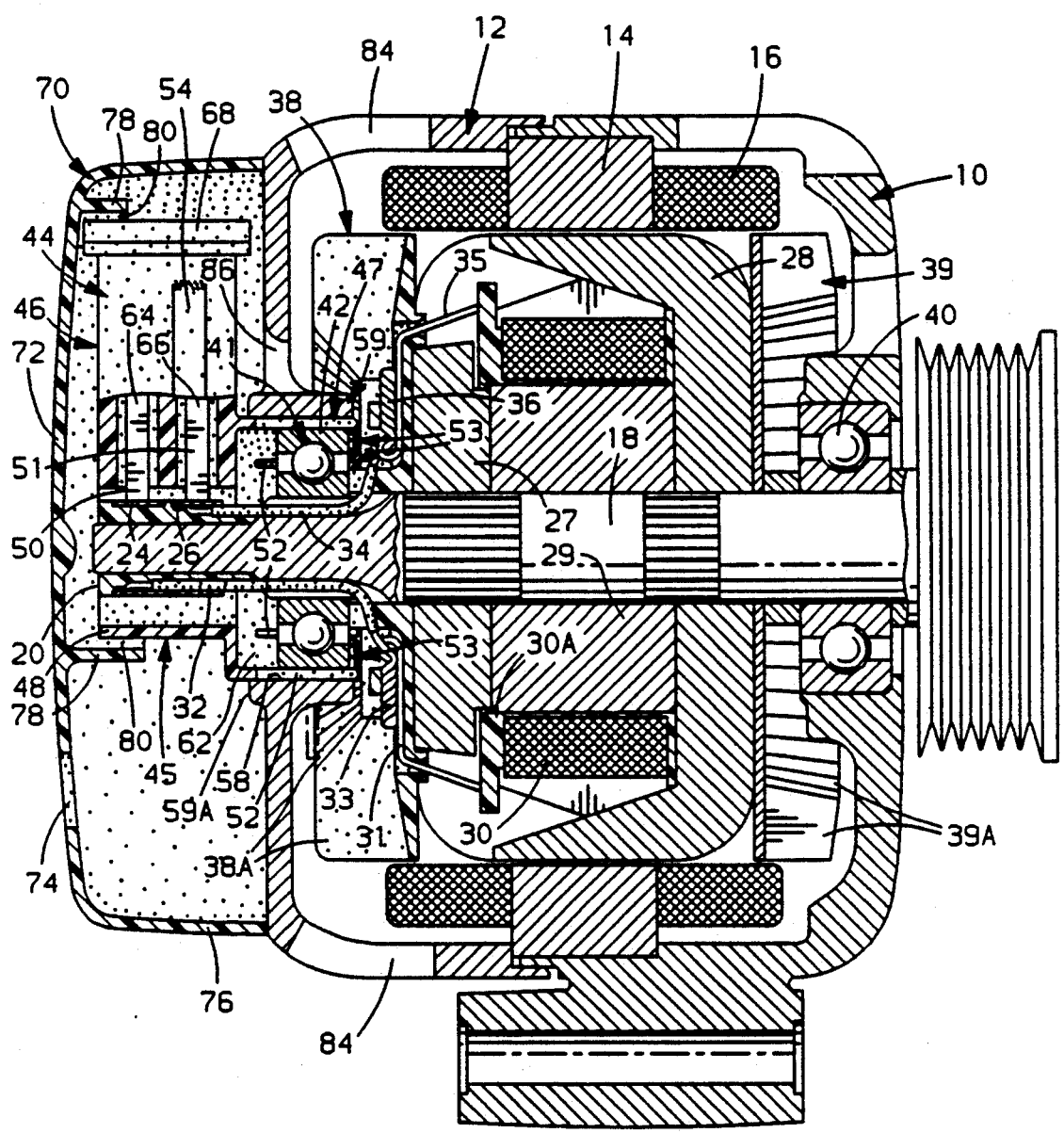
FIG. 1 is a sectional view of an alternating current generator that has a brush holder made in accordance with this invention.

Referring now to the drawings, and more particularly to FIG. 1, an alternating current generator for automotive use is illustrated. This generator has a metallic drive end frame 10 and a metallic slip ring end frame 12. These frames are secured together by means which is not illustrated and the frames support, a stator assembly that is comprised of stator core 14 and stator coil winding 16.

The alternating current generator has a rotor assembly that has a steel rotor shaft 18. This rotor assembly carries and drives a slip ring assembly comprised of insulator 20 and annular copper slip rings 24 and 26. The rotor has pole segments 27 and 28 that are formed of magnetic material such as steel which have interleaved pole teeth. The rotor further has a core 29 that is formed of a magnetic material such as steel which is secured to shaft 18. A field coil 30 is disposed about core 29. The field coil 30 is carried by coil spool 30A that is formed of electrical insulating material. The spool 30A rotates with rotation of shaft 18 and core 29.

One end of the field coil 30 is connected to slip ring 24 by conductors 31 and 32 that are twisted together at 33. The other end of field coil 30 is connected to slip ring 26 by conductors 34 and 35 that are twisted together at 36.

The rotor assembly has two fans, one of which is designated as 38 and the other as 39. Fan 38 has fan blades 38A and fan 39 has fan blades 39A. Fan 39 can be formed of steel and is welded to segment 28. Fan 38 is formed of a plastic material. The coil spool 30A has axially extending posts (not illustrated) that are ultrasonically welded to fan 38 in a manner disclosed in the Gold U.S. Pat. No. 4,588,911.

The right end of rotor shaft 18 is rotatably supported by a ball bearing 40 that is carried by frame 10. The rotor shaft is also rotatably supported by a ball bearing 41 that has a metallic outer race 42 and an inner race that engages the shaft. The manner in which outer race 42 is supported or retained will be described later.

Figure 2:
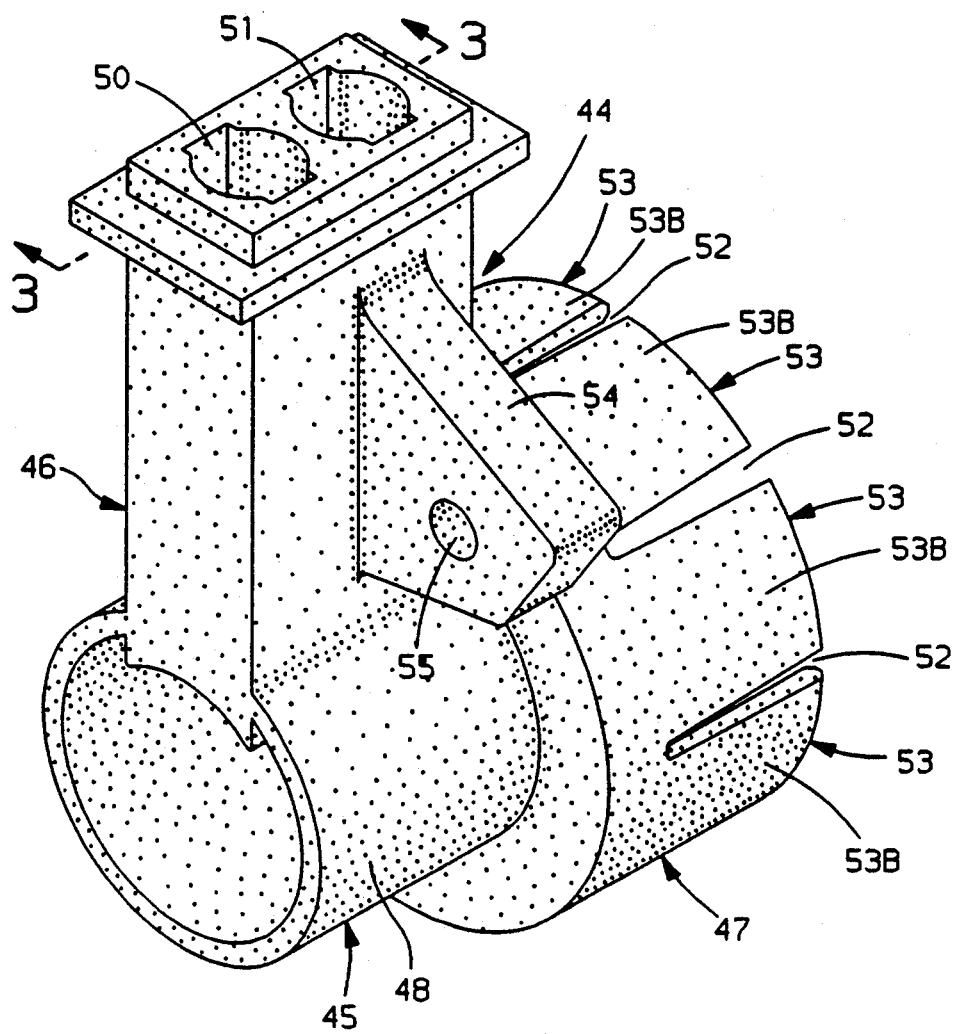
FIG. 2 is a perspective view of a brush holder made in accordance with this invention.
Figure 3:
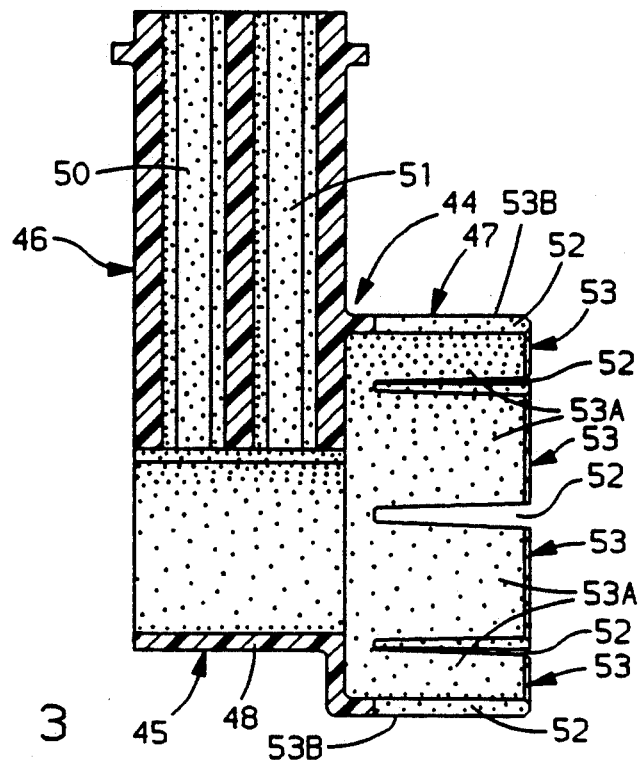
FIG. 3 is a sectional view taken along line 3—3 of FIG. 2.

The alternating current generator has a brush holder generally designated as 44 which is shown in detail in FIGS. 2 and 3. The brush holder 44 is formed of an electrical plastic insulating material and is a one-piece plastic molded part. The brush holder 44 has a tubular contaminant shield portion 45, a brush holding portion 46 and a tubular bearing retainer portion 47. The shield portion 45 has a semicircular wall 48. This wall is joined to the brush holding portion 46.

The brush holding portion 46 has two bores or open-ended chambers 50 and 51 that extend entirely through brush holding portion 46. The inner ends of bores 50 and 51 are open to the interior of shield portion 45. The outer ends of bores 50 and 51 are closed by a cover, as will be more fully described later. The bores 50 and 51 receive brushes and brush springs. The internal wall portions of the bores 50 and 51 slidably support brushes in a manner to be described later.

The bearing retainer portion 47 has eight equally spaced circumferentially spaced slots each designated as 52. These slots extend axially as shown in FIGS. 2 and 3. These slots form air passages or channels, as described in more detail hereinafter. Disposed between the respective slots 52 are eight finger portions each designated as 53. Each portion 53 extends axially and each portion 53 has a cylindrical or arcuate shape. Each portion 53 has an arcuately extending inner surface 53A and an arcuately extending outer surface 53B. As will be described in more detail hereinafter, the surfaces 53A engage outer surface portions of the outer race 42 of bearing 41 when the brush holder 44 is assembled to the generator. Further, surfaces 53B engage the inner surface of a bore formed in frame 12. It can be appreciated that the portions 53 form a generally tubular structure having slots 52.

The brush holder 44 has a flange portion 54 that has a hole 55 extending therethrough. The hole receives a fastener for securing the brush holder to frame 12.

Referring now to FIG. 1, it can be seen that when the brush holder 44 has been assembled to the alternating current generator, the outer surfaces 53B of portions 53 of bearing retainer 47 engage an inner cylindrical surface 58 of hub portion 59 of frame 12. The surface 58 defines a hole or bore that extends through frame 12. Further, as can be seen in FIG. 1, the slots 52 are closed or covered by surface portions of cylindrical surface 58. In this regard, it can be seen that the left ends of slots 52 are located slightly to the right of the left end surface 59A of hub portion 59, as viewed in FIG. 1.

The inner surfaces 53A of portions 53 engage the outer cylindrical surface of the outer race 42 of ball bearing 41. The portions 53 serve to retain and support the outer race 42 of ball bearing 41. Portions 53 have a tight fit between frame surface 58 and the outer surface of outer race 42 and the outer race is therefore retained from rotation or axial movement relative to frame 12. The outer race 42 is not as long as the slots 52. Therefore the left end portions of slots 52 are open to an area in retainer portion 47 designated as 62. These left end portions are inlets for air that passes axially through slots 52 toward fan 38 when the rotor is rotating. It can be appreciated that the slots 52 together with surface 58 and the outer surface of outer race 42 form passages or channels for air that extend axially between area 62 and fan 38. The inlet for these passages is at area 62 and the outlet is adjacent fan 38.

The internal surfaces of bores 50 and 51 of brush holding portion 46 respectively slidably support carbon brushes 64 and 66. The bores 50 and 51 each contain a brush spring (not illustrated) that is compressed between a brush and a cover 68 that is attached to the outer end of brush holding portion 46. The cover 68 has deflectable latch arms (not illustrated) for securing it to the end of brush holding portion 46. The cover closes the outer open ends of bores 50 and 51. The brush springs respectively force the end of brush 64 into contact with slip ring 24 and the end of brush 66 into contact with slip ring 26.

It can be seen that the slip rings 24 and 26 are enclosed by the shield portion 45 and the integral brush holding portion 46 of brush holder 44. This slip ring shielding feature operates to prevent external contaminants from contacting the slip rings.

The brush holder 44 is secured to frame 12 by a threaded fastener (not illustrated) that passes through hole 55 in flange 54. The fastener is threaded into a threaded bore in a boss on frame 12 which is, likewise, not illustrated.

The generator shown in FIG. 1 has a cover designated as 70 which is formed of plastic material. This cover is secured to frame 12 by a fastening means which is not illustrated. The end wall 72 of cover 70 has a plurality of circumferentially spaced air inlet openings, one of which is shown in FIG. 1 and designated as 74. The wall 76 of cover 70 also has air inlet openings which are not illustrated.

The cover 70 has an internal continuous axially extending wall 78. The shape of this wall conforms to the outer shape of the left end of the brush holder 44 shown in FIG. 2. The wall 78 is slightly spaced from the outer surface portion of brush holder 44 to thereby form the space 80 between the wall and the brush holder. This space 80 extends entirely around the left end of brush holder 44. The wall 78, in conjunction with outer wall portions of brush holder 44, form a labyrinth type of seal. Thus, when the rotor is rotating to cause fan 38 to rotate, air is pulled into the interior of cover 70 and into the open end of shield portion 45 of brush holder 44. The air that passes into shield portion 45 will flow to the right along the outer surface of wall 78, will then flow across the end of wall 78 into space 80 and then flow to the left through space 80 to the open end of shield portion 45. Thus, a labyrinth air passage has been formed that tends to prevent contaminants from entering shield portion 45.

The frame 12 has a plurality of circumferentially spaced air outlet openings, two of which are illustrated in FIG. 1 and designated as 84. The frame 12 further has a plurality of circumferentially spaced openings, one of which is shown in FIG. 1 and designated as 86. The openings 86 connect the interior of cover 70 to the interior of frame 12 and provide passages for flow of air from the interior of cover 70 to the interior of frame 12.

The compartment defined by cover 70 and frame 12 contains a voltage regulator and a bridge rectifier which have not been illustrated. These parts are supported by frame 12.

The air flow path through brush holder 44 will now be described. When the generator rotor and fan 38 are driven by an engine on a motor vehicle, the fan 38 pulls air into cover 70 and it causes air to be exhausted from the generator through openings 84. This flow of air passes around wall 78 into space 80. The air then enters the open end of shield portion 45 of brush holder 44. The air now flows axially through shield portion 45 to the left end portions of slots 52. The air now passes axially through the slots 52 toward fan 38. The air is now impelled out of the generator through the outlet openings 84.

As the air passes axially through the interior of shield portion 45, it contacts slip rings 24 and 26 and the ends of brushes 64 and 66. This flow of air therefore tends cool the slip rings and the brushes. Further, moisture contained in the air tends to enhance the development of brush dust film on the slip rings as the air contacts the slip rings. Brush dust that is developed is carried by the air out of the generator through openings 84.

As the air passes through the slots or channels 52, it contacts portions of the outer surface of the outer race 42 of ball bearing 41. This flow of air which is in contact with the outer race 42 cools the ball bearing to thereby reduce bearing temperature.

As the fan 38 rotates, it pulls air from the interior of cover 70 into frame 12 through openings 86. This air is exhausted through air outlet openings 84. As the air flows from openings 86 to openings 84, it contacts the left end of stator coil winding 16 to cool it. This air does not pass through brush holder 44. The air that does pass through brush holder 44 and which is exhausted through openings 84, also contacts the left end of stator coil winding 16 to provide some additional cooling of the stator winding.

The embodiments of the invention in which an exclusive property or privilege is claimed are defined as follows:

1. In combination, a dynamoelectric machine having an end frame and a rotor, said rotor having a rotor shaft, a slip ring assembly carried by said rotor shaft having a pair of axially spaced metallic slip rings, a fan rotatably driven by said rotor shaft that is axially spaced from said slip ring assembly, an opening in said end frame having an internal surface, a ball bearing having an outer race located in said opening, said rotor shaft having a portion that is rotatably supported by the inner race of said ball bearing, said slip ring assembly located at one side of said frame and said fan located on an opposite side of said frame, a brush holder having a tubular shield portion, a brush holding portion and a tubular bearing retainer portion, said tubular shield portion having an open end that forms an air inlet, said tubular bearing retainer portion disposed between and engaging respectively said internal surface of said opening in said frame and the outer surface of said outer race of said ball bearing, said tubular shield portion being positioned to enclose said slip rings, brushes slidably supported by said brush holding portion, said brushes projecting into the interior of said tubular shield portion and having end surfaces that respectively engage said slip rings, and a plurality of circumferentially spaced and axially extending air passages disposed about said outer race of said ball bearing, said air passages connecting the interior of said tubular shield portion to an area adjacent said fan, said air passages comprising a plurality of circumferentially spaced and axially extending slots formed in said bearing retainer portion.

2. The combination according to claim 1 where said slots extend radially entirely through said bearing retainer portion, and where said passages are defined by internal side walls of said slots, portions of said internal surface of said opening in said frame and portions of the outer surface of the outer race of the ball bearing.

3. The combination according to claim 1 where said dynamoelectric machine is an alternating current generator.

4. The combination according to claim 1 where said brush holder is a one-piece part formed of plastic material.

5. A brush holder for a dynamoelectric machine comprising, a tubular axially extending shield portion having an open end that is adapted to enclose the slip rings of a dynamoelectric machine, a brush holding portion extending from said tubular shield portion, said brush holding portion having at least one bore which is open at one end to the interior of said tubular shield portion, said bore adapted to receive a brush, and a tubular bearing retainer portion that is adapted to engage the outer race of a ball bearing, said bearing retainer portion having a plurality of circumferentially spaced and axially extending slots, said slots being adapted to form air passages connecting the interior of said tubular shield portion to the exterior of said brush holder.

6. The brush holder according to claim 5 where said slots extend radially entirely through said bearing retainer portion.

7. The brush holder according to claim 5 where said brush holder is a one-piece part formed of plastic material.

* * * * *